US007012517B2

(12) United States Patent
Mueller et al.

(10) Patent No.: US 7,012,517 B2
(45) Date of Patent: Mar. 14, 2006

(54) DAMAGE CONTROL SYSTEM FOR SHIPS

(75) Inventors: Karl-Heinz Mueller, Tarmstedt (DE); Matthias Schulze, Lueneburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/448,224

(22) Filed: May 30, 2003

(65) Prior Publication Data

US 2004/0239495 A1 Dec. 2, 2004

(51) Int. Cl.
*G08B 25/00* (2006.01)

(52) U.S. Cl. ................. 340/525; 340/524; 340/538.22; 340/539.24; 340/539.25; 340/825.36; 340/825.49; 700/17

(58) Field of Classification Search ................ 340/525, 340/524, 538.22, 539.24, 539.25, 691.6, 340/825.36, 825.49; 700/17
See application file for complete search history.

(56) References Cited

U.S. PATENT DOCUMENTS 4,482,845 A 11/1984 Roylance et al.
5,086,722 A * 2/1992 Sloope et al. ............. 114/74 R
5,297,252 A * 3/1994 Becker ....................... 345/803
5,375,150 A * 12/1994 Scarola et al. .............. 376/216
5,859,885 A * 1/1999 Rusnica et al. ............. 376/259
5,892,440 A * 4/1999 Bryan ........................ 340/524

FOREIGN PATENT DOCUMENTS

DE 4 333 060 A1 3/1995
DE 19 524 756 A1 1/1997
DE 19 636 853 A1 3/1998

* cited by examiner

*Primary Examiner*—Daryl C Pope
(74) *Attorney, Agent, or Firm*—Sughrue Mion, PLLC

(57) ABSTRACT

A damage control system for monitoring, suppressing and eliminating leakage damage, fire damage and/or ABC contamination after collisions, running aground, the effects of weapons, etc., has an automation and monitoring system for system failures, voltage outages and equipment failures and has an operating station at which a perspective layout of the ship, which represents the rooms of the ship, can be displayed.

Figure 1:
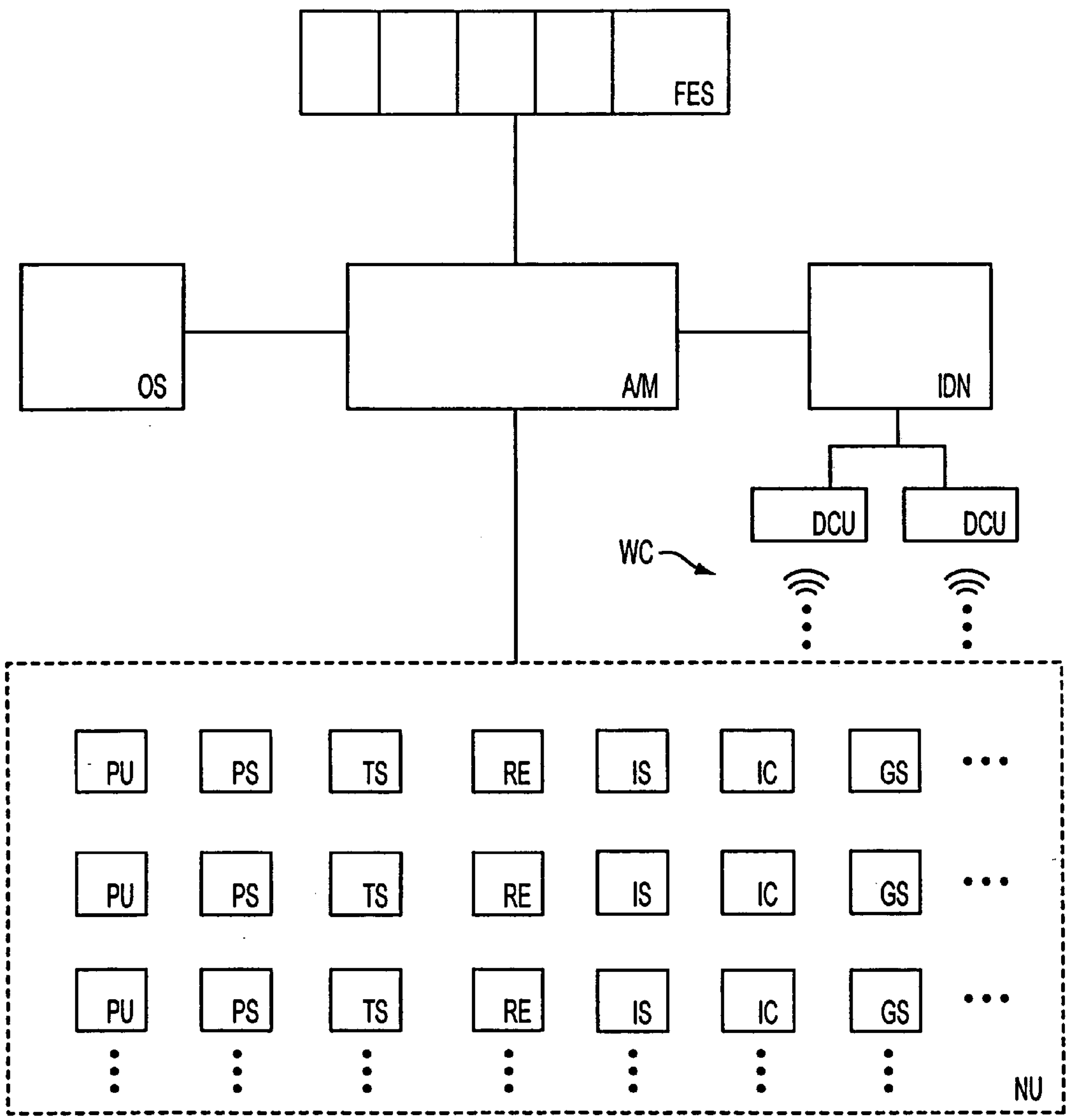

To obtain a picture of the situation more rapidly after a collision, running aground or the effects of weapons, an alarm unit is installed in each room or in each of a group of rooms of the ship allocated together, these alarms cooperating with the damage control system, so that when deployed, the display of the corresponding room and/or group of rooms allocated together undergoes a color change in the perspective layout of the ship.

20 Claims, 2 Drawing Sheets

III - V: SECTIONS

S1-S7, A0-A2, P0-P4, W3: ROOMS

DAMAGE CONTROL SYSTEM FOR SHIPS

This invention relates to a damage control system for ships for monitoring, suppressing and eliminating damage, including battle damage, due to leakage, fire and/or ABC contamination after a collision, running aground, effects of weapons, etc., comprising an automation and monitoring system for detecting outages and failures of installations, power and equipment, and comprising an operating station at which a perspective diagram of the ship, showing the ship's layout, can be displayed.

The damage prevention for which the damage control system described above is used is extremely time-critical with regard to fire fighting in particular. With the method currently in use for obtaining an overall picture of the situation, it may happen that obtaining a picture of the situation is delayed in an unacceptable manner due to emergency measures implemented by the crew walking rounds and commissioned to perform observation tasks. In addition, there are delays when casualties are discovered and must be removed to a secure location.

The object of this invention is to improve upon the damage control system described above for ships, so that a picture of the situation, which is required for initiating measures for damage prevention, can be obtained more quickly, so that any required damage prevention measures can be planned on the basis of the best possible picture of the situation.

This object is achieved according to the present invention by the fact that an alarm unit is installed in each room or in the area of a group of several rooms of the ship that are allocated together, this alarm unit cooperating with the damage control system, so that when deployed, the display of the corresponding room and/or group of rooms allocated together in the perspective layout of the ship undergoes a color change. This color change in the respective ship's room makes it possible for the ship's safety officer to differentiate immediately and without any great effort between areas of the ship that are already controlled and those that are not. For example, the ship's safety officer may, without any great deliberation, dispatch extra personnel for control measures in any rooms that are not yet under control.

The color change in the perspective layout of the ship displayed at the operating station may be from 10% gray to pure white, for example.

The alarm units may be designed as pushbuttons situated in the main access area of the particular room and/or group of rooms.

In addition, the alarm units may also be designed as proximity switches, but in any case security against unintentional deployment should be provided.

With temperature sensors mounted in and/or on the bulkhead walls of at least the most important operating areas of the ship, e.g., the engine room, the gear room, the gas turbine room, the pump rooms, the refrigeration rooms, etc., their measured values being displayable on the operating station of the damage control system, it is expediently possible to make precise statements with regard to the temperature conditions in the bulkhead walls, which also border the ships' rooms in which fires have been detected. This eliminates inaccurate appraisal measures, etc.

The temperature sensors are advantageously positioned at regular, predefinable intervals from one another in and/or on the bulkhead walls, so that the most accurate possible temperature profile can be compiled with respect to the particular bulkhead wall.

The temperature profile among the temperature sensors can be determined advantageously at the operating station by interpolation, etc.

If the damage control system includes recording equipment arranged in the main accesses of at least the main operating areas of the ship by means of which admission of a person to this main operating area and departure of a person from this main operating area can be detected, and the instantaneous occupancy of the main operating area can be relayed to the operating station, it is possible to ensure that before implementing damage control measures which under some circumstances are harmful for humans, precise information is available at the operating station with regard to the presence of people in the particular room.

The recording equipment may be designed as magnetic card readers or numeric keyboards having a display and operating keys. The latter is appropriate to eliminate the need for magnetic cards. In the case of numeric keyboards, each person entering or leaving the particular room must enter a sequence of numbers assigned exclusively to that person.

As an alternative, an electronic system may be provided to automatically recognize chips worn on a person (PIC: personal identification card).

To be able to determine the precise location of people inside a room, it is advantageous if the damage control system includes infrared sensors situated in the ceiling area of at least the main operating areas of the ship and by means of which the number and location of people in the particular main operating area can be detected and relayed to the operating station.

Monitoring of rooms important for the operation of a ship is also improved by using infrared cameras, which are installed in the corners of at least the main operating areas of the ship and by means of which the temperature conditions in the respective main operating area can be detected and relayed to the operating station.

To detect the atmospheric conditions in rooms of a ship, it is advantageous if the damage control system has gas sensors, which are installed at least in the main operating areas of the ship and by means of which the concentrations of gas and/or fire extinguishing agent in the respective main operating areas can be detected and relayed to the operating station.

To reduce the wiring complexity of the damage control system, it is expedient if the alarm units and/or the temperature sensors and/or the recording equipment and/or the infrared sensors and/or the infrared cameras and/or the gas sensors communicate by wireless connection with data collecting units, which are in turn connected to an information and data network of the damage control system.

A data collecting unit may advantageously be provided for each ship's security area or each compartment, thus yielding advantages with regard to the self-sufficiency of the ship's security area and/or compartment.

The data traffic can be organized better and also reduced if the alarm units and/or temperature sensors and/or recording devices and/or infrared sensors and/or infrared cameras and/or gas sensors have data preprocessing, and thus intelligent units and/or sensors are used.

Extinguishing measures required for fire fighting can be advantageously implemented with remote-controlled stationary fire extinguishing systems, which can be used without any risk for members of the crew during operation of the damage control system according to this invention.

With the temperature sensors provided in the bulkhead walls, it is also possible to detect water levels, etc., in the respective rooms of the ship.

Figure 2:
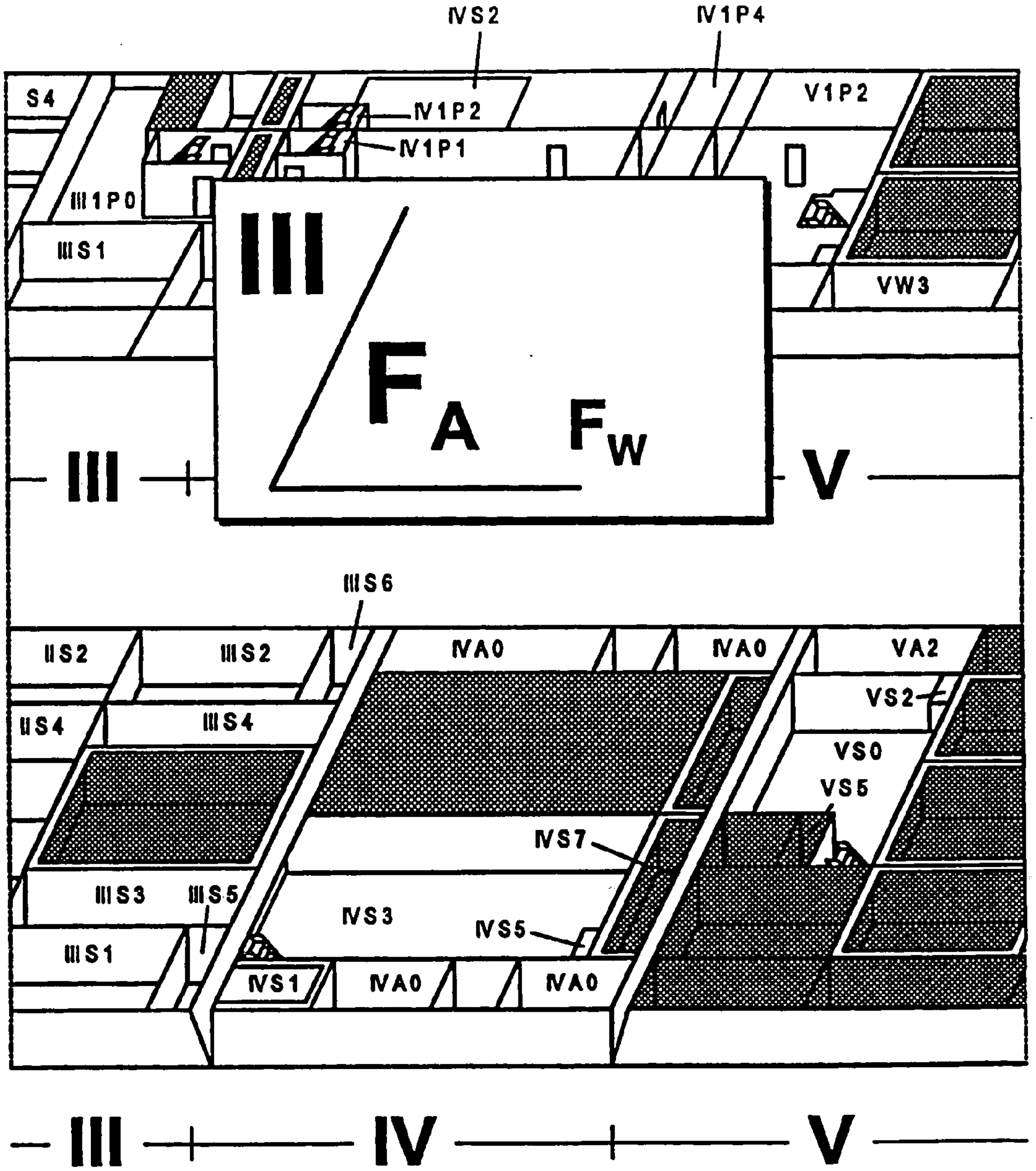

This invention is explained in greater detail below on the basis of one embodiment with reference to the drawing, in which:

FIG. 1 shows, in block-diagram form, an embodiment of a damage control system according to the invention; and FIG. 2 shows a part of a perspective ship's plan such as that displayed by the damage control system according to this invention.

A damage control system according to one embodiment of this invention, illustrated by way of example in FIG. 1 is used to monitor, suppress and eliminate damage, including battle damage, e.g. due to leakage, fire and/or ABC contamination after a collision, running aground, the effects of weapons, etc.

The damage control system includes an automation and monitoring system A/M for system failures, power failures and equipment failures. At an operating station OS of the damage control system according to this invention, a perspective ship's plan which depicts the rooms of the ship can be displayed on a display screen, as shown partially in FIG. 2.

If vibration, detonation or a strike onboard a battleship is detected, the damage situation of the battleship must be detected as rapidly as possible. The perspective layout of the ship illustrated partially in FIG. 2 is used by the ship's safety officer, who is stationed at the operator console, to ascertain and determine the damage situation of the ship. The overview of the situation by the ship's safety officer is greatly improved if, in accordance with the invention, all the monitored rooms of the ship show a color change in the layout of the ship, as displayed on the display screen at the operator console, e.g. are switched from 10% gray to pure white. In this way, the ship's safety officer is able to evaluate the room control status much more reliably, e.g., after a three- to five-minute interval has elapsed.

To accomplish the color change in the display of the layout of the ship, preferably, pushbutton-activated units PU are installed in the main access area to each room of the ship. When the respective room is checked, this pushbutton unit is operated to confirm that the check has been conducted and, if applicable, that there is no damage. These pushbuttons are tied into the automation and monitoring system as additional measurement sites and are linked directly to the color change of the rooms that are displayed in the perspective layout of the ship.

Instead of or in addition to pushbuttons, proximity switches PS may also be used. However, the possibility of unintentional deployment preferably should reliably be precluded for all possible technical solutions.

It is also possible for a pushbutton and/or a proximity switch to be assigned to a certain group of rooms of the ship, which belong together in some form, in which case the total number of pushbuttons and/or proximity switches to be provided and to be tied into the automation and monitoring system can then be reduced.

Temperature sensors TS are installed at regular intervals in and/or on the bulkhead walls of at least the most important operating areas of the battleship, e.g., the engine room, the gas turbine room, the gear room, the pump rooms, the refrigeration rooms, etc. The temperature values detected by these temperature sensors may be displayed, e.g., in an extra image on a display screen on the operator console of the damage control system according to this invention. This greatly facilitates temperature monitoring by the ship's safety officer and/or the ship's captain. In addition, the temperature values thus detected are far more accurate than the temperature values made available with the methods known in the past.

The temperature sensors here are arranged so that they allow detection of a temperature profile of the respective bulkhead wall. The temperature profile between the individual temperature sensors, which are spaced a distance apart, can be calculated by interpolation or comparable mathematical procedures at the operating station.

The temperature sensors are also tied into the automation and monitoring system of the damage control system.

To have the most accurate possible information regarding the location of crew members at any point in time, which is especially important in emergency situations and the like, registration equipment RE, such as magnetic card readers or numeric keyboards with a display and operating keys, is mounted at the main accesses to at least the main operating areas of the ship. These include, e.g., the engine rooms, the gas turbine rooms, the pump rooms, the power generating station, etc. When a crew member enters the corresponding main operating area, he must either pass his personally assigned magnetic strip card through the magnetic card reader or enter his personally assigned combination of numbers on the numeric keyboard. The magnetic card readers and numeric keyboards can be included in the automation and monitoring system of the damage control system.

As an alternative, it is possible to provide an electronic system and chips (PIC=personal identification card) to be worn by each individual person of the crew. The chips worn by crew members can then be detected automatically by the electronic system; the corresponding principle is already in use in operation of ski lifts, for example.

Each crew member leaving the corresponding main operating area again can of course be logged out by passing his magnetic strip card through the magnetic card reader again or by again entering his personally assigned numerical sequence into the automation and monitoring system via the numeric keyboard.

Within the automation and monitoring system, a list of people is kept for each main operating area, indicating who is in the respective main operating area at any given point in time. This list of people can be called up and is available at any time at the operating station.

Infrared sensors IS are preferably installed beneath the room ceiling of at least the main operating areas so that more extensive information with regard to the location of individual crew members within a main operating area is available at the operator console and/or in the automation and monitoring system. These infrared sensors determine not only the number of people in the main operating area but also their precise locations within the main operating area. This information is relayed to the automation and monitoring system.

Infrared cameras IC are preferably installed in the corners of at least the main operating areas, their images being superimposed on the temperature display in the automation and monitoring system and/or at the operating station. This further improves the decision-making assistance with regard to the conditions to be expected in the main operating area. After a fire is extinguished, the personnel reentering the respective room having a stationary fire extinguishing system can be much more familiar with the situation and can be informed of possible risks in the room.

At least in the main operating areas, remote-controlled stationary fire extinguishing systems FES are preferably provided for indirectly fighting fires in the respective main operating areas. These stationary fire extinguishing systems are based on, for example, Halon, $CO_2$, DAS (pressurized foam fire extinguishing system), etc., as the extinguishing medium. Before using such a stationary fire extinguishing system, it is important to clarify unambiguously whether it is safe to deploy the stationary fire extinguishing system by checking on the list of people for the particular room in the automation and monitoring system. In other words, it must be absolutely certain that no one is present in the particular main operating area, because the health of anyone present would be harmed by the use of the various extinguishing media. In special cases, the infrared sensors may under some circumstances provide more detailed information here with regard to possible deployment of stationary fire extinguishing systems, because, by using the infrared sensors, it is possible to determine the precise location of any people still inside the main operating area where fire-fighting measures are to be implemented.

Gas sensors OS may be used to monitor atmospheric conditions in burning rooms or rooms where fire-fighting measures have already been implemented; these gas sensors detect the concentrations of gas and/or extinguishing agent in the respective rooms and relay this information to the automation and monitoring system. The conditions within a burning room as well as the conditions after fire fighting in a room where a fire has been extinguished can be monitored by such gas sensors. For example, such sensors may be used as the basis for the decision with regard to afterflooding or secondary flooding of a room with fire extinguishing agents. In addition, such gas sensors are also suitable for monitoring atmospheric conditions in rooms of a ship adjacent to a burning room or a room in which a fire has already been extinguished. This is important because fire-extinguishing gases, e.g., $CO_2$, may penetrate into adjacent compartments, because of construction deficiencies, for example.

The pushbuttons, proximity switches, temperature sensors, magnetic card readers, numeric keyboards, infrared sensors, infrared cameras and gas sensors mentioned above preferably communicate via wireless connection WC with the automation and monitoring system so that cable connections, etc., are minimized. A data collecting unit DCU provided e.g. in each ship's security area and/or in each compartment is capable of communicating with the units mentioned above and then relaying the data to an information and data network IDN of the damage control system.

To minimize the data traffic, the units mentioned above are provided with data preprocessing.

What is claimed is:

1. A damage control system for monitoring, suppressing and eliminating damage on a ship, comprising:

- an automation and monitoring system for detecting at least one of system outages, installation failures, power failures and equipment failures;
- an operating station on which a perspective layout of the ship, representing the layout of the ship, is displayed; and
- a notification unit in each of respective areas corresponding at least to groups of rooms of the ship allocated together, and operationally connected to the operating station, wherein triggering of one of the notification units causes the display of the corresponding group of rooms to undergo a color change in the perspective layout of the ship on the operating station.

2. The damage control system as recited in claim 1, wherein each room of the ship has one of the notification units, and triggering of one of the notification units causes the display of the corresponding room to undergo a color change in the perspective layout of the ship on the operating station.

3. The damage control system as recited in claim 1, wherein the color change on the perspective layout of the ship displayed at the operating station is from 10% gray to pure white.

4. The damage control system as recited in claim 1, wherein the notification units comprise pushbutton-activated units installed in the main access area of the respective areas.

5. The damage control system as recited in claim 1, wherein the notification units comprise proximity switches which are secured against unintentional deployment.

6. The damage control system as recited in claim 1, wherein the notification units comprise temperature sensors installed in or on bulkhead walls of at least some of the operating areas of the ship, and wherein the sensors output measured temperature values for display at the operating station.

7. The damage control system as recited in claim 6, wherein the temperature sensors are installed in at least the engine room, the gas turbine room, the gear room, the pump rooms, and the refrigeration rooms of the ship.

8. The damage control system as recited in claim 6, wherein the temperature sensors are installed essentially at regular, predefined spacing along the bulkhead walls.

9. The damage control system as recited in claim 6, wherein the operating system calculates a temperature gradation between the temperature sensors from the measured temperature values by interpolation.

10. The damage control system as recited in claim 1, wherein the notification units comprise registration equipment installed in main accesses of at least primary operating areas of the ship, wherein the equipment registers entry of a person into the primary operating areas and departure of the person from the primary operating areas, and wherein the registration equipment outputs the registered information as current occupancy information to the operating station.

11. The damage control system as recited in claim 10, wherein the registration equipment comprises magnetic card readers.

12. The damage control system as recited in claim 10, wherein the registration equipment comprises numeric keyboards each having a display and operating keys.

13. The damage control system as recited in claim 10, wherein the registration equipment comprises electronic equipment automatically detecting a chip worn on the person.

14. The damage control system as recited in claim 1, wherein the notification units comprise infrared sensors installed in ceiling areas of at least primary operating areas of the ship, wherein the sensors detect the number and location of people in the respective primary operating area as sensor data, and wherein the sensors output the sensor data to the operating station.

15. The damage control system as recited in claim 1, wherein the notification units comprise infrared cameras installed in corners of at least primary operating areas of the ship, wherein the infrared cameras detect temperature conditions in the respective primary operating areas as temperature information, and wherein the cameras output the temperature information to the operating station.

16. The damage control system as recited in claim 1, wherein the notification units comprise gas sensors installed at least in primary operating areas of the ship, wherein the sensors detect concentrations of at least one of gas and extinguishing agent in the respective primary operating areas as sensor data, and wherein the sensors output the sensor data to the operating station.

17. The damage control system as recited in claim 1, further comprising data collecting units and an information and data network, wherein the notification units communicate by wireless connection with the data collecting units, and wherein the data collecting units are connected to the information and data network.

18. The damage control system as recited in claim 17, wherein one of the data collecting units is provided respectively for at least one of each security area and each compartment of the ship.

19. The damage control system as recited in claim 1, wherein the notification units are configured to preprocess data gathered by the notification units.

20. The damage control system as recited in claim 1, further comprising remote-controlled stationary fire extinguishing systems.

* * * * *